(12) United States Patent
Pak et al.

(10) Patent No.: US 10,951,429 B2
(45) Date of Patent: *Mar. 16, 2021

(54) SERVER INITIATED REMOTE DEVICE REGISTRATION

(71) Applicant: Arm Ltd, Cambridge (GB)

(72) Inventors: Yongbeom Pak, Oulu (FI); Szymon Sasin, Oulu (FI)

(73) Assignee: ARM LTD, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,586

(22) Filed: Jan. 8, 2020

(65) Prior Publication Data

US 2020/0145477 A1    May 7, 2020

Related U.S. Application Data

(63) Continuation of application No. 15/218,902, filed on Jul. 25, 2016, now Pat. No. 10,554,731.

(30) Foreign Application Priority Data

Aug. 3, 2015 (GB) ...................................... 1513750

(51) Int. Cl.
*H04L 12/18* (2006.01)
*H04L 29/08* (2006.01)
(Continued)

(52) U.S. Cl.
CPC .......... *H04L 12/18* (2013.01); *H04L 12/2859* (2013.01); *H04L 41/0809* (2013.01);
(Continued)

(58) Field of Classification Search
CPC ... H04L 12/18; H04L 67/104; H04L 67/1046; H04L 67/34; H04L 12/2859; H04L 67/04;
(Continued)

(56) References Cited

U.S. PATENT DOCUMENTS 5,349,643 A    9/1994  Cox et al.
5,872,968 A    2/1999  Knox et al.
(Continued)

FOREIGN PATENT DOCUMENTS

AU    2013100802 A4    7/2013
CN       1656830 A     8/2005
(Continued)

OTHER PUBLICATIONS

Office Action dated Mar. 31, 2020 for Chinese Application 201610629935.5, 16 pages.
(Continued)

*Primary Examiner* — Kyung H Shin
(74) *Attorney, Agent, or Firm* — Patterson Thuente Pedersen, P.A.

(57) ABSTRACT

A machine implemented method of server initiated registration of a remote device with a second server when the remote device is provisioned or pre-provisioned for registration with a first server, the method comprising: transmitting a bootstrap message from a bootstrap server to the first server, the bootstrap message comprising instruction for registration of the remote device with the second server; receiving the bootstrap message at the first server; sending, from the first server, the bootstrap message to the remote device; and registering the remote device with the second server.

11 Claims, 7 Drawing Sheets

(51) Int. Cl.
*H04L 12/28* (2006.01)
*H04W 8/24* (2009.01)
*H04W 4/70* (2018.01)
*H04L 12/24* (2006.01)
*H04W 4/50* (2018.01)
*H04W 12/04* (2021.01)
*H04W 12/00* (2021.01)
*H04L 29/12* (2006.01)

(52) U.S. Cl.
CPC ............... *H04L 67/10* (2013.01); *H04W 4/50* (2018.02); *H04W 4/70* (2018.02); *H04W 8/245* (2013.01); *H04W 12/0023* (2019.01); *H04W 12/04031* (2019.01); *H04L 61/256* (2013.01)

(58) Field of Classification Search
CPC ... H04L 67/125; H04L 41/0809; H04L 41/28; H04L 67/10; H04L 61/256; H04L 63/08; H04L 67/025; H04L 67/14; H04L 67/24; H04L 69/40; H04W 8/245; H04W 12/04031; H04W 12/12; H04W 4/70; H04W 4/50; H04W 12/0023
See application file for complete search history.

(56) References Cited

U.S. PATENT DOCUMENTS

| | | | |
|---|---|---|---|
| 6,463,535 | B1 | 10/2002 | Drews |
| 6,950,660 | B1 * | 9/2005 | Hsu .................... H04L 12/2859 455/456.1 |
| 7,363,514 | B1 | 4/2008 | Behren |
| 7,882,345 | B1 | 2/2011 | Christensen |
| 7,971,045 | B1 | 6/2011 | Currid et al. |
| 8,108,455 | B2 | 1/2012 | Yeager et al. |
| 8,244,845 | B2 * | 8/2012 | Rao ...................... H04L 67/125 709/223 |
| 8,370,491 | B1 | 2/2013 | Breau et al. |
| 9,064,117 | B1 | 6/2015 | Worsley |
| 9,307,405 | B2 | 4/2016 | Curtis et al. |
| 9,860,235 | B2 | 1/2018 | Curtis et al. |
| 10,027,646 | B2 | 7/2018 | Curtis et al. |
| 10,129,268 | B2 | 11/2018 | David et al. |
| 10,185,829 | B2 | 1/2019 | Sasin et al. |
| 10,321,311 | B2 | 6/2019 | Sasin et al. |
| 10,554,731 | B2 | 2/2020 | Pak et al. |
| 2002/0090085 | A1 | 7/2002 | Vanstone et al. |
| 2003/0028763 | A1 | 2/2003 | Malinen et al. |
| 2005/0010758 | A1 | 1/2005 | Landrock et al. |
| 2006/0053276 | A1 | 3/2006 | Lortz et al. |
| 2006/0075242 | A1 | 4/2006 | Aissi et al. |
| 2006/0104234 | A1 | 5/2006 | Zhang |
| 2006/0117177 | A1 | 6/2006 | Buer |
| 2006/0150241 | A1 | 7/2006 | Huh et al. |
| 2006/0200855 | A1 | 9/2006 | Willis |
| 2006/0259765 | A1 | 11/2006 | Song et al. |
| 2006/0277406 | A1 | 12/2006 | Hashimoto et al. |
| 2007/0011446 | A1 | 1/2007 | Kato et al. |
| 2007/0043608 | A1 | 2/2007 | May et al. |
| 2007/0055867 | A1 | 3/2007 | Kanungo et al. |
| 2007/0130476 | A1 | 6/2007 | Mohanty |
| 2007/0143388 | A1 | 6/2007 | Futa et al. |
| 2007/0220266 | A1 | 9/2007 | Cooper et al. |
| 2007/0220589 | A1 | 9/2007 | Salowey et al. |
| 2008/0034207 | A1 | 2/2008 | Cam-Winget et al. |
| 2008/0130902 | A1 | 6/2008 | Foo et al. |
| 2009/0013177 | A1 | 1/2009 | Lee et al. |
| 2009/0063851 | A1 | 3/2009 | Nijdam |
| 2009/0086977 | A1 | 4/2009 | Berggren |
| 2009/0129597 | A1 | 5/2009 | Zimmer et al. |
| 2009/0215477 | A1 | 8/2009 | Lee et al. |
| 2009/0276620 | A1 | 11/2009 | McCarron et al. |
| 2009/0287922 | A1 | 11/2009 | Herwono et al. |
| 2009/0313466 | A1 | 12/2009 | Naslund et al. |
| 2010/0304716 | A1 | 12/2010 | Hoeksel et al. |
| 2011/0154454 | A1 | 6/2011 | Frelechoux |
| 2011/0161663 | A1 | 6/2011 | Nakhjiri |
| 2011/0225296 | A1 | 9/2011 | Hong et al. |
| 2012/0042081 | A1 | 2/2012 | Liao et al. |
| 2012/0079031 | A1 * | 3/2012 | Matthews ............... H04L 12/18 709/206 |
| 2012/0108207 | A1 | 5/2012 | Schell et al. |
| 2012/0122423 | A1 | 5/2012 | Helmreich |
| 2012/0221725 | A1 | 8/2012 | Schroeder, Jr. et al. |
| 2013/0035067 | A1 | 2/2013 | Zhang et al. |
| 2013/0081113 | A1 | 3/2013 | Cherian et al. |
| 2013/0095789 | A1 | 4/2013 | Keevill et al. |
| 2013/0150105 | A1 | 6/2013 | Clevorn et al. |
| 2013/0160094 | A1 * | 6/2013 | Luo ........................ H04L 41/28 726/4 |
| 2013/0174241 | A1 | 7/2013 | Cha et al. |
| 2013/0222109 | A1 | 8/2013 | Lim |
| 2013/0310003 | A1 | 11/2013 | Sadhvani et al. |
| 2014/0089652 | A1 | 3/2014 | Cerri et al. |
| 2014/0099916 | A1 | 4/2014 | Mallikarjunan et al. |
| 2014/0165147 | A1 | 6/2014 | Hershberg et al. |
| 2014/0289790 | A1 | 9/2014 | Wilson |
| 2014/0330952 | A1 * | 11/2014 | Starsinic ............... H04W 12/04 709/223 |
| 2015/0067329 | A1 | 3/2015 | Ben et al. |
| 2015/0071139 | A1 | 3/2015 | Nix |
| 2015/0113592 | A1 | 4/2015 | Curtis et al. |
| 2015/0113599 | A1 | 4/2015 | Curtis et al. |
| 2015/0237031 | A1 | 8/2015 | Neuman et al. |
| 2015/0296470 | A1 | 10/2015 | Kim et al. |
| 2015/0305008 | A1 | 10/2015 | Kim et al. |
| 2015/0319263 | A1 | 11/2015 | Koch et al. |
| 2015/0358824 | A1 | 12/2015 | Kim et al. |
| 2016/0065556 | A1 | 3/2016 | Sasin et al. |
| 2016/0072808 | A1 | 3/2016 | David et al. |
| 2016/0191489 | A1 | 6/2016 | Curtis et al. |
| 2017/0019427 | A1 | 1/2017 | Vank et al. |
| 2017/0039373 | A1 | 2/2017 | Sasin et al. |
| 2017/0041287 | A1 | 2/2017 | Pak et al. |
| 2018/0295119 | A1 | 10/2018 | Curtis et al. |
| 2018/0324168 | A1 | 11/2018 | Curtis et al. |
| 2019/0044957 | A1 | 2/2019 | David et al. |
| 2019/0156040 | A1 | 5/2019 | Sasin et al. |
| 2019/0289467 | A1 | 9/2019 | Sasin et al. |

FOREIGN PATENT DOCUMENTS

| | | |
|---|---|---|
| CN | 101217541 A | 7/2008 |
| CN | 101951595 A | 1/2011 |
| CN | 101309301 B | 11/2012 |
| EP | 2466791 A1 | 6/2012 |
| GB | 2533385 A | 6/2016 |
| KR | 20140113007 A | 9/2014 |
| WO | WO-2006059195 A1 | 6/2006 |
| WO | WO-2009141493 A1 | 11/2009 |
| WO | WO-2011123329 A1 | 10/2011 |
| WO | WO-2013049292 A1 | 4/2013 |
| WO | WO-2014048236 A1 | 4/2014 |
| WO | WO-2014069968 A1 | 5/2014 |
| WO | WO-2014114354 A1 | 7/2014 |
| WO | WO-2014116152 A1 | 7/2014 |
| WO | WO-2014182674 A1 | 11/2014 |
| WO | WO-2014190177 A1 | 11/2014 |
| WO | WO-2015042370 A1 | 3/2015 |
| WO | WO-2015065913 A1 | 5/2015 |

OTHER PUBLICATIONS

Application and File history for U.S. Appl. No. 16/434,567, filed Sep. 19, 2019, Inventors: Sasin, et al.
Application and File history for U.S. Appl. No. 16/252,896, filed Jan. 21, 2019, Inventors: Sasin, et al.
Application and File history for U.S. Appl. No. 14/842,065, filed Sep. 1, 2015, Inventors: Sasin, et al.
Application and File history for U.S. Appl. No. 15/218,902, filed Jul. 25, 2016, Inventors: Pak, et al.

(56) References Cited

OTHER PUBLICATIONS

Application and File history for U.S. Appl. No. 15/226,523, filed Aug. 2, 2016, Inventors: Sasin, et al.
Application and File history for U.S. Appl. No. 14/056,423, filed Oct. 17, 2013, Inventors: Curtis, et al.
Application and File history for U.S. Appl. No. 14/056,459, filed Oct. 17, 2013, Inventors: Curtis, et al.
Application and File history for U.S. Appl. No. 14/056,468, filed Oct. 17, 2013, Inventors: Curtis, et al.
Application and File history for U.S. Appl. No. 14/843,420, filed Sep. 2, 2015, Inventors: David, et al.
Application and File history for U.S. Appl. No. 15/060,639, filed Mar. 4, 2016, Inventors: Curtis, et al.
Application and File history for U.S. Appl. No. 16/009,277, filed Jun. 15, 2018, Inventors: Curtis, et al.
Application and File history for U.S. Appl. No. 16/035,765, filed Jul. 16, 2018, Inventors: Curtis, et al.
Certicom Corp., "Certicom Device Certification Authority for ZigBee Smart Energy," Retrieved from http://certicom.com/index.php/device-authentication-service/smart-energy-device-certificate-service, Oct. 2013, 2 pages.
Combined Search and Examination Report for Great Britain Application No. GB1806259.6, dated Jul. 12, 2018, 6 pages.
Combined Search and Examination Report under Section 17 and 18(3) for Great Britain Application No. GB1513748.2, dated Mar. 17, 2016, 7 pages.
Combined Search and Examination Report under Sections 17 and 18(3) for Great Britain Application No. GB1513750.8, dated Mar. 17, 2016, 6 pages.
Examination Report for GB Application No. 1513748.2, dated Nov. 29, 2019, 7 pages.
Examination Report under Section 18(3) for Application No. GB1513750.8, dated Nov. 10, 2017, 3 pages.
First Office Action dated Dec. 29, 2018 for Chinese Application No. 201480056752.8, 38 pages.
HP Device Registration Repository Capability; M2M06-014 Device Registry Repository Capability; ETSI Draft; ETSI/M2M M2M05_025 Device Registry Repository Capability; European Telecommunications Standards Institute, 650, Route Des Lucioles; F-06921 Sophia-Antipolis; France, vol. SmartM2M, Oct. 13, 2009, 2 pages.
International Preliminary Report on Patentability for Application No. PCT/GB2014/053096, dated Apr. 28, 2016, 9 pages.
International Preliminary Report on Patentability for Application No. PCT/GB2014/053097, dated Apr. 28, 2016, 10 pages.
International Preliminary Report on Patentability for Application No. PCT/GB2014/053098, dated Apr. 28, 2016, 14 pages.
International Search Report and Written Opinion for Application No. PCT/GB2014/053096, dated Jan. 30, 2015, 12 pages.
International Search Report and Written Opinion for Application No. PCT/GB2014/053097, dated Jan. 30, 2015, 15 pages.
International Search Report and Written Opinion for Application No. PCT/GB2014/053098, dated Apr. 8, 2015, 20 pages.
Klas G., et al., "Lightweight M2M: Enabling Device Management and Applications for the Internet of Things," White Paper, Vodafone, Arm and Ericsson, Feb. 26, 2014, 16 pages.
Panwar M., et al., "Security for IoT: An Effective DTLS with Public Certificates," 2015 International Conference on Advances in Computer Engineering and Applications (ICACEA), IEEE, Mar. 2015, pp. 163-166.
Partial International Search Report for Application No. PCT/GB2014/053098, dated Jan. 29, 2015, 5 pages.
Schukat M., et al., "Public Key Infrastructures and Digital Certificates for the Internet of Things," IEEE 2015, 26th Irish Signals and Systems Conference (ISSC), Jun. 2015, 5 pages.
Search Report under Section 17(5) for Great Britain Application No. GB1415861.2, dated Mar. 18, 2015, 3 pages.
Search Report under Section 17(5) dated Jan. 12, 2015 for GB Application No. 1415562.6 , 5 pages.
Second Office Action dated May 17, 2019 for Chinese Application No. 201480056752.8, 9 pages.

\* cited by examiner

SERVER INITIATED REMOTE DEVICE REGISTRATION

RELATED APPLICATION

This application is a continuation of application Ser. No. 15/218,902 filed Jul. 25, 2016, which claims priority to GB Application No. 1513750.8 filed Aug. 3, 2015, which is hereby incorporated herein in its entirety by reference.

TECHNICAL FIELD

The present techniques relate, in general, to a server initiated method of registration of a remote device or devices with a second server when the remote device or devices have already been registered with or are pre-provisioned to register with a first server. The present techniques include, where necessary, de-registering the remote device from the first server.

BACKGROUND ART

The Internet of Things encompasses devices and networks that are IP-enabled and Internet-connected, along with the Internet services monitoring and controlling those devices. Such IP-enabled devices connected to the internet may be termed data processing devices, end nodes, remote devices or Internet of Things (IoT) devices and include sensors, machines, active positioning tags, radio-frequency identification (RFID) readers and building automation equipment to name but a few. Data exchange between programs, computers and Machine-to-Machine (M2M) is a vital element of the Internet of Things and different programs, computers and processors are used in different environments.

The Wireless Embedded Internet is a subset of the Internet of Things and is generally represented by resource-limited embedded devices, often battery powered and connected by low-power, low-bandwidth wireless networks to the Internet.

An example of a network technology where Machine-to-Machine (M2M) communication is widely applied is a low-power wireless network, such as an IEEE 802.15.4 based embedded and sensor network. More recently, as M2M devices have become IP enabled, systems have become more open by using IP as a networking protocol.

Following the introduction of IEEE 802.15.4 other standards were developed to standardize an IP adaption for such wireless embedded links. For example, the IPv6 over Low Power Wireless Standard (6LoWPAN) is a set of standards which enable the efficient use of IPv6 over low-power, low-rate wireless networks on simple embedded devices through an adaption layer and the optimization of related protocols.

The Open Mobile Alliance Lightweight LWM2M is a standard applicable to 6LoWPAN and is focussed on constrained cellular and M2M devices. A Lightweight Machine-to-Machine (LWM2M) Bootstrap process is used to provide mandatory information through the Bootstrap Interface for remote devices so that they can perform registration with one or more servers. Registration assigns a remote device to a cloud based server to access applications across a domain. A domain may be a logical grouping of devices and when the domain is exported to Domain Name System (DNS), then the domain value normally equates to the DNS domain name.

Techniques described herein provide additional features to the LWM2M Bootstrap process.

SUMMARY OF THE INVENTION

In a first aspect present techniques provide a machine implemented method of server initiated registration of a remote device with a second server when the remote device is provisioned or pre-provisioned for registration with a first server, the method comprising: transmitting a bootstrap message from a bootstrap server to the first server, the bootstrap message comprising instruction for registration of the remote device with the second server; receiving the bootstrap message at the first server; sending the bootstrap message from the first server to the remote device; and registering the remote device with the second server.

In a second aspect, the present techniques provide a machine implemented method of server initiated registration of a remote device with a second server when the remote device is provisioned or pre-provisioned for registration with a first server, the method comprising: receiving a bootstrap message at the first server, the bootstrap message comprising at least the location of the second server; sending, from the first server, the bootstrap message to the remote device; and communicating between the remote device and the first server to cause the remote device to register with the second server.

In this way, a bootstrap server may successfully cause a remote device to register with a server using another server as a proxy server.

Techniques may include transmitting the bootstrap message from a bootstrap server to the first server. This may be a chosen method if the bootstrap server comprises the information to be transmitted otherwise the information may be delivered to the first server from other sources.

Prior to transmitting the bootstrap message from the bootstrap server to the first server, the method may include transmitting the bootstrap message from the bootstrap server to the remote device, the bootstrap server and the remote device failing to establish a successful connection. In response to a failed connection between bootstrap server and remote device, the present techniques provide a way for successful bootstrapping to be completed. The bootstrap server may broadcast its bootstrap message, which may be useful if the bootstrap server does not know the address of a first server. In order to reduce network traffic, the bootstrap server may store multiple bootstrap messages and transmit the multiple bootstrap messages to the first server in one bulk message. The bootstrap message may comprise instruction for the remote device to bootstrap with the bootstrap server, which may be desirable if, for example, the bootstrap server has a higher level of trust with the remote device or if it is not wanted to send complete bootstrapping information to the remote device via a second server. When bootstrapping with the bootstrap server, the bootstrap server returns a bootstrap message to the remote device comprising at least the address of the second server. Alternatively, the bootstrap message comprises instruction for the remote device to bootstrap with the second server, the bootstrap message comprising at least the address of the second server.

Prior to registering the remote device at the second server, the method may include de-registering the remote device from the first server. In order to manage and reduce network traffic, the first server may receive a plurality of bootstrap messages and queue the plurality of bootstrap messages in a memory store. Such a technique may enable the bootstrap message to be sent to the remote device in response to a communication from the remote device to the first server. In a mesh network, such a low power, wireless network the remote device, the first device and the second server may be nodes in a peer network and the remote device may be an Internet of Things device.

In a third aspect, present techniques provide a machine implemented method of server initiated registration of a remote device with a second server when the remote device is provisioned or pre-provisioned with a first server, the method comprising: receiving a bootstrap message from the first server at the remote device, the bootstrap message comprising instruction for registration of the remote device with the second server; and registering the remote device with the second server. The remote device can therefore be bootstrapped with a second server. The bootstrap message may comprise instruction for the remote device to bootstrap with the bootstrap server in which case the remote device receives a bootstrap message from the bootstrap server comprising at least the address of the second server; or the bootstrap message may comprise instruction for the remote device to bootstrap with the second server, in which case the bootstrap message comprises at least the address of the second server. Further, prior to registering the remote device at the second server, the method may include de-registering the remote device from the first server.

In a fourth aspect, present techniques provide a machine implemented method of server initiated registration of a remote device with a second server when the remote device is provisioned or pre-provisioned for registration with a first server, the method comprising: transmitting a bootstrap message from a bootstrap server to the first server; receiving the bootstrap message at the first server, the bootstrap message comprising instruction for the remote device to carry out registration; sending the bootstrap message from the first server to the remote device; and registering the remote device with the second server.

In a fifth aspect, present techniques provide a machine implemented method of server initiated registration of a remote device with a second server when the remote device is provisioned or pre-provisioned with a first server, the method comprising: receiving a bootstrap message from the first server at the remote device, the bootstrap message comprising instruction for registration of the remote device; and registering the remote device with the second server.

BRIEF DESCRIPTION OF DRAWINGS

Embodiments will now be described, by way of example only, and with reference to the accompanying drawings of which.

DETAILED DESCRIPTION

Figure 1:
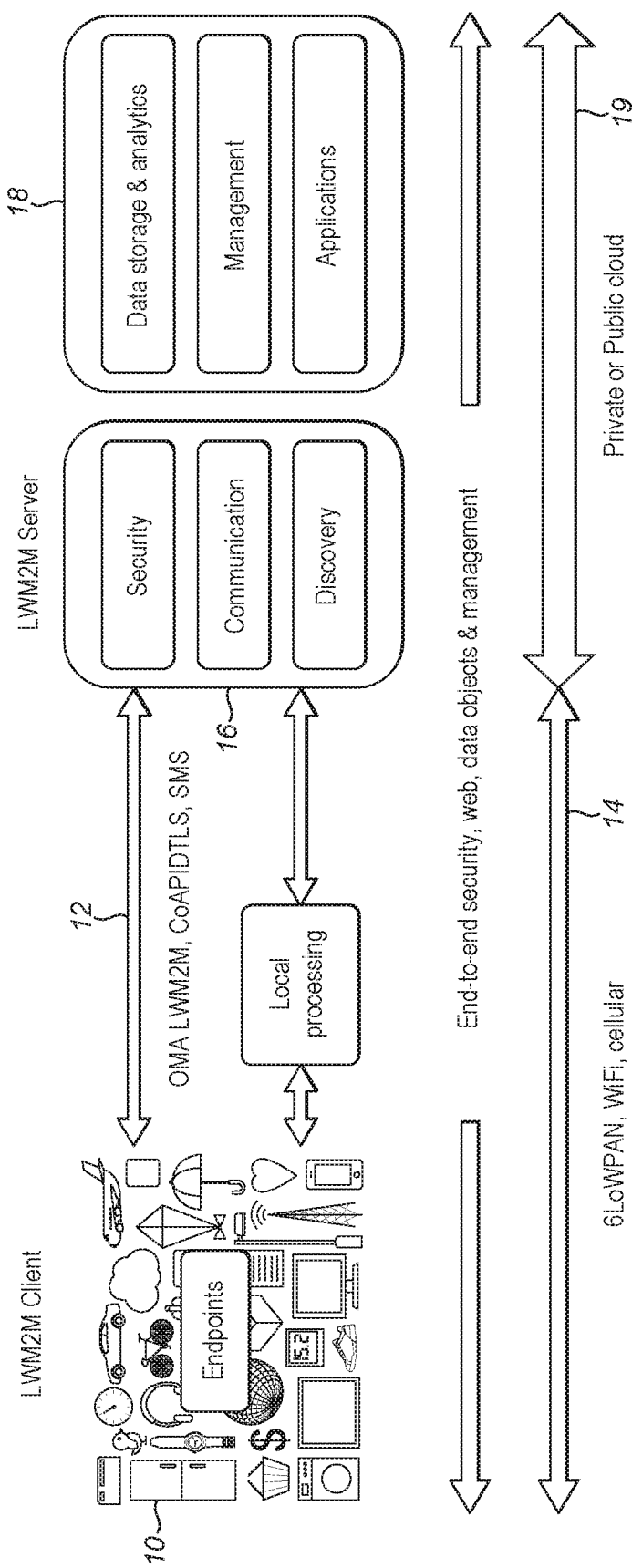
FIG. 1 is a schematic diagram of a LWM2M deployment scenario.

Referring to FIG. 1 a deployment scenario for an M2M remote device 10 is shown across a range of market segments from streetlights and electric meters to home and building automation. The remote devices 10 may interface 12 with a LWM2M server 16 based on open IETF standards such as Constrained Application Protocol (CoAP) over a low-power wireless network. One such low-power wireless network is an IEEE 802.15.4 based embedded and sensor network using IPv6 over Low Power Wireless Standard (6LoWPAN) 14. The LWM2M server 16 can interface with the wider world-wide web network 18 enabling deployment of M2M applications from a private server, private cloud or public cloud environment 19.

Figure 2:
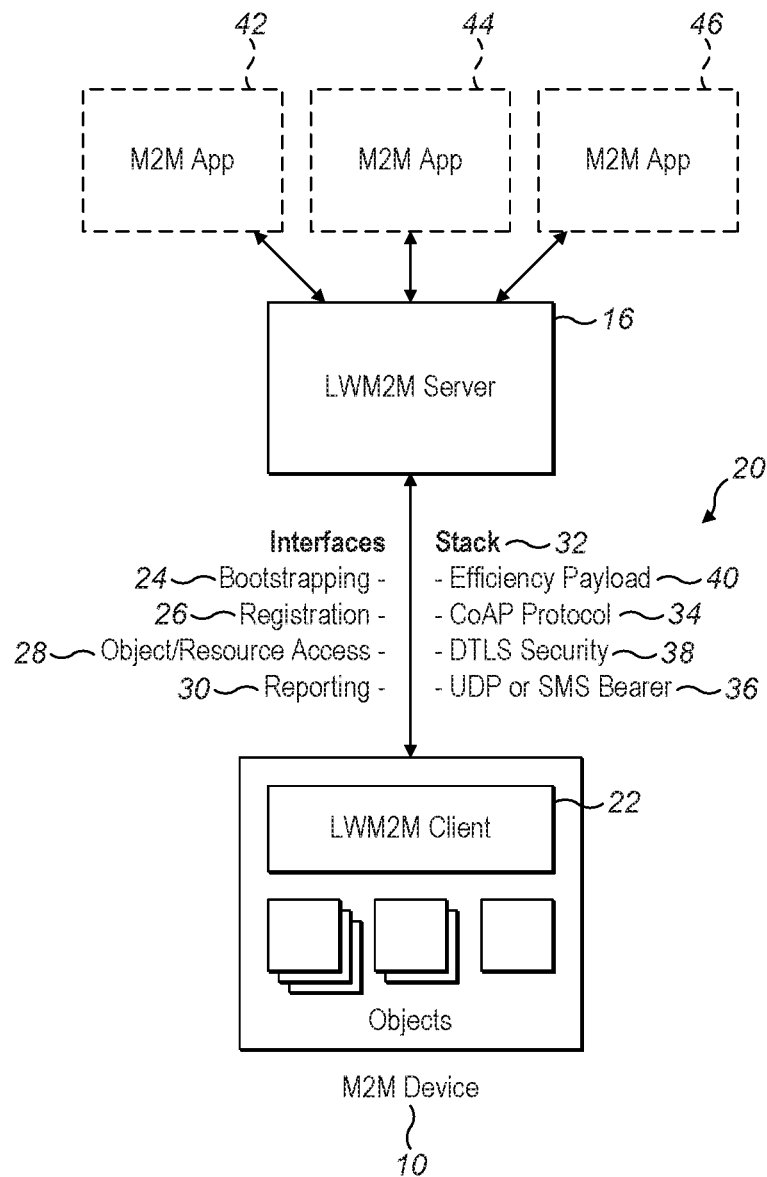
FIG. 2 is a schematic diagram of a LWM2M architecture with Server and Client.
Figure 3:
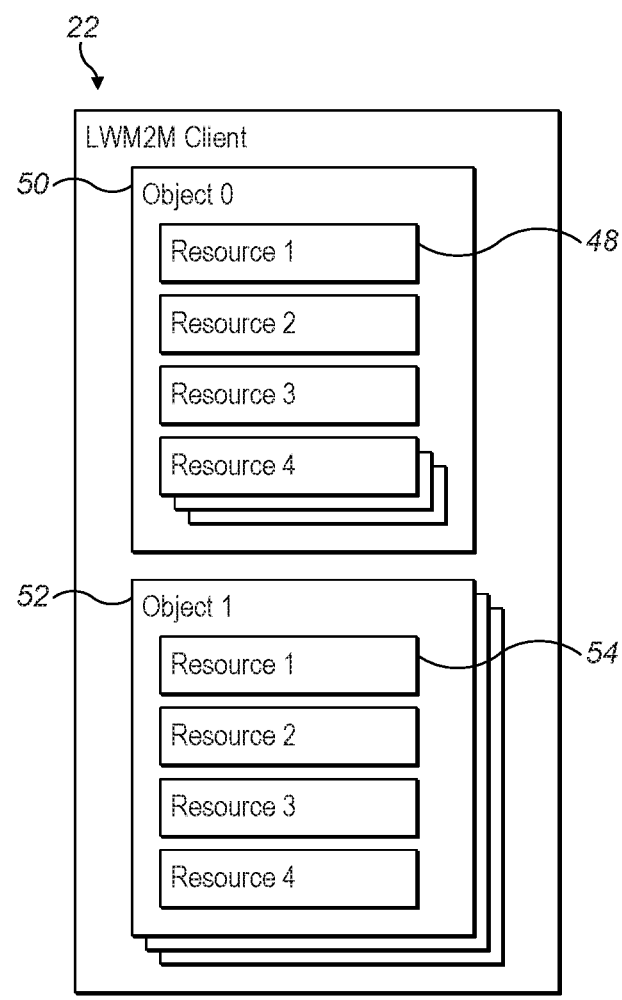
FIG. 3 is a schematic diagram of a LWM2M object model.

FIGS. 2 and 3 show the LWM2M architecture 20 which technically defines the application layer communication protocol for use between a client 22 on the M2M remote device 10 and server software on a LWM2M server 16. The client 22 resides on the device 10 and is integrated as a software library or a built-in function of a module or device 10. The server 16 is located in a private or public data center and can be hosted by the M2M Service Provider, Network Service Provider or Application Service Provider. Four logical interfaces are defined between the server and client, namely bootstrapping 24 being pre-provisioned or client/server initiated; registration 26 to register the client 22 and its objects 50; object/resource access or device management 28 to enable server 16 access to an Object 50 or resource 48; and information reporting 30 for notifications with new resource 48 values.

The LWM2M protocol stack 32 uses the Constrained Application Protocol (CoAP) 34 as the underlying transfer protocol over User Datagram Protocol (UDP) and Short Message Server (SMS) bearers 36. The CoAP protocol 34 defines the message header, request/response codes, message options and retransmission mechanisms. The CoAP protocol 34 is an alternative to HTTP for Representational State Transfer (RESTful) Application Programming Interfaces (APIs) on resource-constrained devices 10 and supports the methods of GET, POST, PUT, DELETE, which can be mapped to those of HTTP. Unlike HTTP, CoAP messages are exchanged asynchronously between CoAP end-points over a datagram-oriented transport such as UDP. CoAP messages are encoded in a binary format allowing functionality to start with a 4-byte overhead. LWM2M defines the UDP Binding with CoAP as mandatory whereas the SMS Binding with CoAP is optional, which in effect means that LWM2M client 22 to server 16 interaction may occur both via SMS and UDP 36.

The LWM2M architecture 20 use security protocols to secure communications between client 22 and server 16 using a Datagram Transport Layer Security (DTLS) 38. DTLS 38 is used to provide a secure channel between the LWM2M server 16 and the LWM2M client 22 for all efficient payloads 40. The efficient payloads 40 can be plain text for individual resources and Binary TLV or JSON for resource batches (Object or Resource Arrays). DTLS 38 security modes include both pre-shared key and public key technology to support embedded devices 10.

M2M application 42 developers can manage the devices 10 remotely through a M2M web application 44 and a M2M device management application 46.

Referring to FIG. 3, the client 22 illustrated in FIG. 2 is shown in more detail. Each piece of information made available by the LWM2M client 22 is a Resource 48. A Resource 48 is a piece of information that can be read, written or executed and is accessed with URIs:

/{Object ID}/{Object Instance]/[Resource ID}, for example /3/0/1 (Device Object, Manufacturer Resource).

The Resources 48 are further logically organized into Objects 50. Each LWM2M client 22 can have any number of Resources 48, each of which belongs to an Object 50. For example, a Firmware Object 52 may contain all the Resources 54 used for firmware update purposes.

Although not shown in FIG. 3, a set of objects for device management purposes include:

Security object to handle security aspects between management servers 16 and the client 22 on the device 10;

Server object to define data and functions related to the management server 16;

Access control object to define for each of several permitted management servers 16 the access rights the servers 16 have for each data object on the client 22;

Device object to detail resources on the M2M device 10 related to device 10 specific information;

Location object to group those resources that provide information about the current location of the M2M device 10;

Connectivity object to group together resources on the M2M device 10 that assist in monitoring the status of a network connection; and Connection statistics object to group together resources on the M2M device 10 that hold statistical information about an existing network connection.

As an example, the device object allows remote retrieval of device information such as manufacturer, model, power information, free memory and error information. Furthermore the device object provides a resource for initiation of a remote reboot or factory reset.

As discussed in more detail with reference to FIGS. 4A and 4B, the LWM2M standard defines a provisioning and bootstrapping 24 functionality that allows the server 16 to manage the keying, access control and configuration of the device 10 to enroll with the server 16. The LWM2M Bootstrap server 64 is used to provide information through the Bootstrap Interface 24 for client 22 so that the client 22 can perform its registration with one or more servers 16. After the bootstrap sequence, the client 22 has a server account and optionally some other object instances such as Access Control or Connectivity Object.

Bootstrapping for complete provisioning and key management may be pre-configured bootstrapping such as from Flash; smart card bootstrapping such as from a SIM card or use of a bootstrap server for initial setup or re-configuration and keying in the modes client-initiated bootstrapping and server-initiated bootstrapping.

Figure 4A:
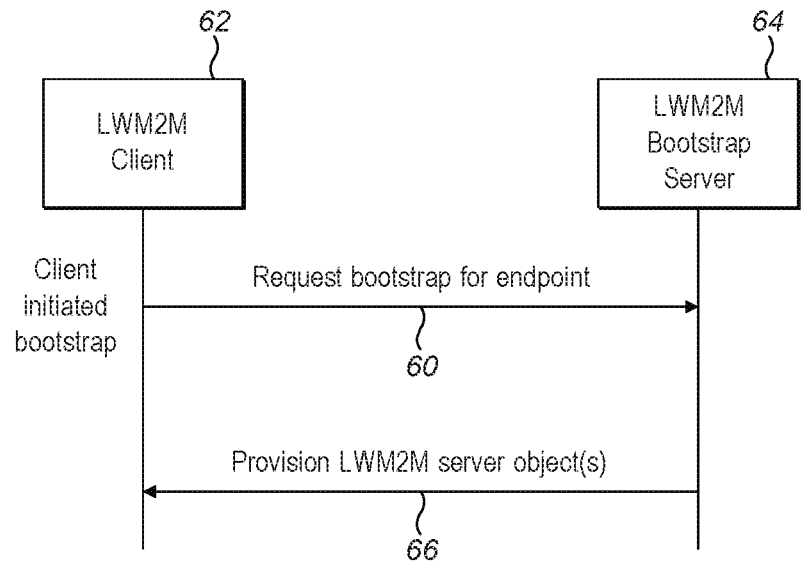
FIG. 4A is a schematic diagram of a client initiated bootstrap.

In its most simplified form as shown in FIG. 4A a client initiated bootstrap comprises a request for bootstrap for a remote device at step 60 from a LWM2M client 62. In response, a LWM2M bootstrap server 64 provides a provision of LWM2M server objects 66 to the LWM2M client 62. Typically, a bootstrap server 64 gives a device server's information according to OMA LWM2M. These may include the address, such as the IP address, the security mode of the device server or the address only.

Figure 4B:
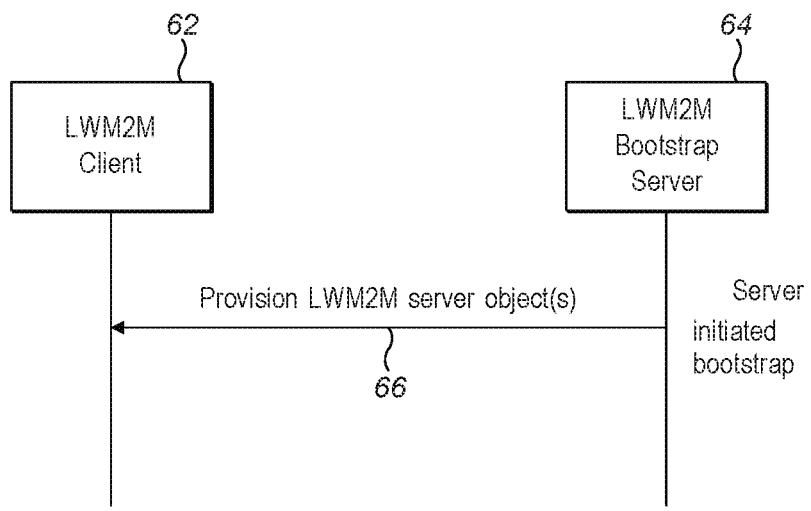
FIG. 4B is a server initiated bootstrap.

Referring to FIG. 4B a server initiated bootstrap comprises a provision of LWM2M server objects 66 only from LWM2M bootstrap server 64 to LWM2M client 62.

A remote device may be pre-provisioned with information of an assigned server or it may receive information of an assigned server as part of the bootstrapping process. In either case it may be desirable to assign a remote device to another server so that the remote device will register with that different cloud based server. The another server may be in addition to, or in place of, the first server.

In both these cases, prior art techniques require that the bootstrap server needs to be able to connect to the remote device in order to provision the remote device with new information including at least the address of the another server.

Techniques disclosed herein address those cases where the bootstrap server cannot connect to the remote device. This may be because the bootstrap server does not know the remote device's address, perhaps because the address has changed since the initial bootstrapping and provisioning. Further, the remote device may be switched-off or asleep causing a communication time-out, or the remote device may be inaccessible for being protected behind a firewall or Network Address Translator (NAT). Present techniques also address those cases where the remote device is pre-provisioned with an assignment of a server and needs to be re-provisioned with another server in addition to or in place of the server.

Further techniques and embodiments will now be described with reference to FIGS. 5 to 10. Throughout the following description, like references shall be used to describe like parts and process steps.

Figure 5:
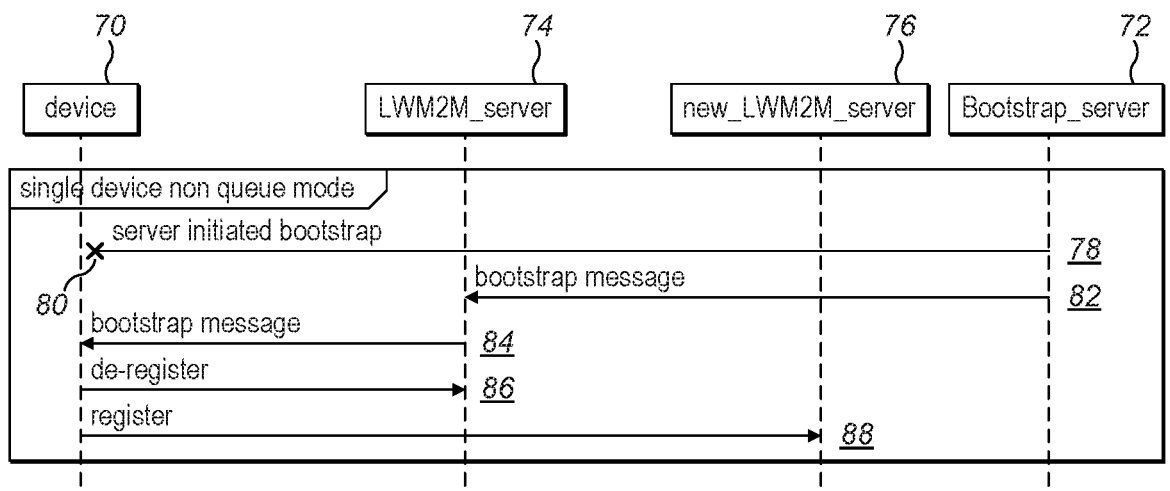
FIG. 5 is a schematic diagram of a bootstrap process to assign a new LWM2M server for a single remote device in a non-queue mode.

FIG. 5 is a schematic diagram of a bootstrap process to assign a new LWM2M server for a single remote device in a non-queue mode according to present techniques.

The bootstrap process includes a remote device 70, a bootstrap server 72, a LWM2M server 74 and a new LWM2M server 76. At step 78 a server initiated bootstrap is initiated and the bootstrap server 72 attempts to connect to the remote device 70. The bootstrap server 78 fails at step 80 to connect to the device 70. The bootstrap server 78 then attempts to connect with the LWM2M server 74 at step 82 and upon establishing a successful connection delivers the bootstrap information to the LWM2M server 74. Since the LWM2M server 74 has previously been provisioned with the remote device 70, the LWM2M server 74 is able to connect to the remote device 70 and deliver the bootstrap information to the remote device 70 at step 84. Upon receiving the bootstrap information the remote device de-registers with the LWM2M server 74 at step 86 and at step 88 registers with new LWM2M server 76.

Figure 6:
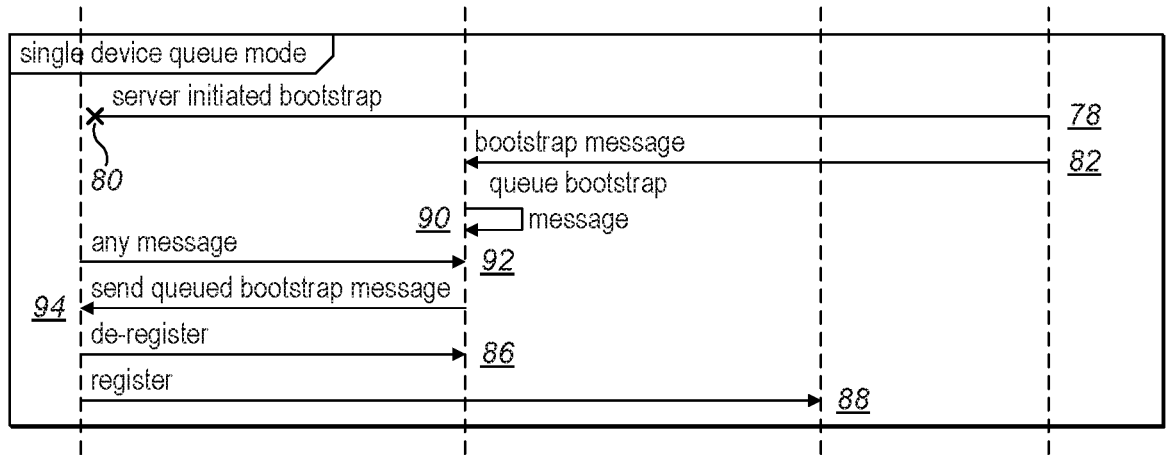
FIG. 6 is a schematic diagram of a bootstrap process to assign a new LWM2M server for a single remote device in a queue mode.

FIG. 6 is a schematic diagram of a bootstrap process to assign a new LWM2M server for a single remote device in a queue mode according to present techniques.

The bootstrap process includes the remote device 70, the bootstrap server 72, the LWM2M server 74 and the new LWM2M server 76. At step 78 a server initiated bootstrap is initiated and the bootstrap server 72 attempts to connect to the remote device 70. The bootstrap server 78 fails at step 80 to connect to the device 70. The bootstrap server 78 then attempts to connect with the LWM2M server 74 at step 82 and upon establishing a successful connection delivers the bootstrap information to the LWM2M server 74. The LWM2M server 74 has previously been provisioned with the remote device 70 and so the LWM2M server 74 is able to connect to the remote device 70 and deliver the bootstrap information to the remote device 70. Rather than deliver the bootstrap information to the remote device 70 immediately, the bootstrap information is queued by the LWM2M server 74 in step 90. An ability to queue the bootstrap information may be useful if the remote device 70 is only periodically awake and during the time when the remote device 70 is powered down, it may not be possible for the LWM2M server 74 to connect to the remote device 70. The remote device 70 may also only periodically connect to the network. For example, a remote device 70 programmed as a rain sensor may power up only periodically when internet connection is available or when a certain amount of rain data has been accumulated. Therefore, at step 92, the remote device 70 sends a message, which may be in the form of data information, to the LWM2M server 74. Upon receipt of the message from the remote device 70 the LWM2M server 74 sends the queued bootstrap information to the remote device 70, step 94. Upon receiving the bootstrap information the remote device de-registers with the LWM2M server 74 at step 86 and at step 88 registers with new LWM2M server 76.

Figure 7:
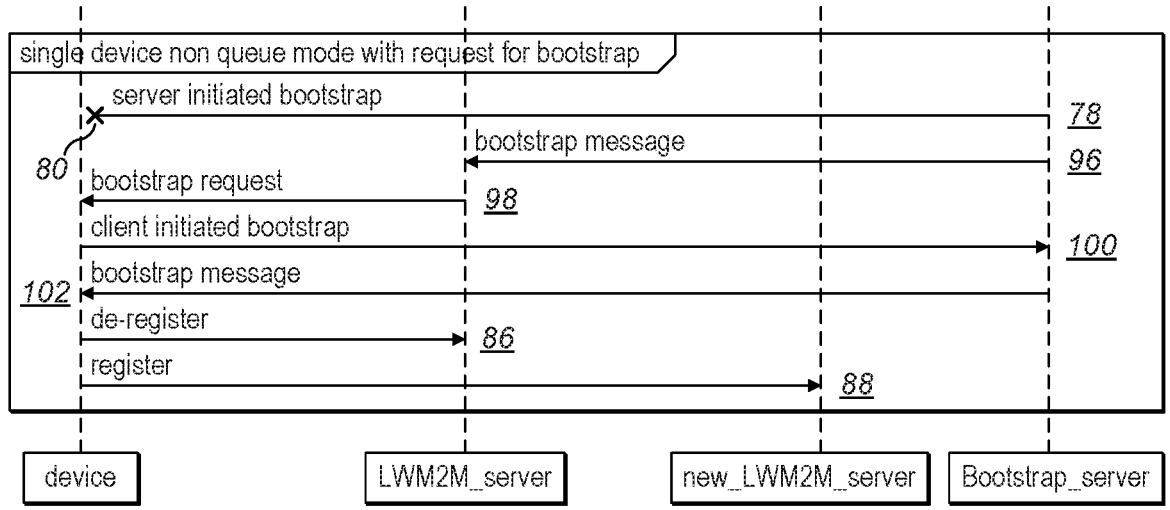
FIG. 7 is a schematic diagram of a bootstrap process to assign a new LWM2M server for a single remote device where the remote device is instructed to connect to the bootstrap server to receive the bootstrap information.

FIG. 7 is a schematic diagram of a bootstrap process to assign a new LWM2M server for a single remote device where the remote device is instructed to connect to the bootstrap server to receive the bootstrap information according to present techniques.

The bootstrap process includes the remote device 70, the bootstrap server 72, the LWM2M server 74 and the new LWM2M server 76. At step 78 a server initiated bootstrap is initiated and the bootstrap server 72 attempts to connect to the remote device 70. The bootstrap server 78 fails at step 80 to connect to the remote device 70. At step 96, a message from the bootstrap server 72 to the LWM2M server 74 is sent, which comprises instructions that the remote device 70 may (in the sense that the remote device should or must) bootstrap with the bootstrap server 72 in the form of a bootstrap request. At step 98, the bootstrap request is sent from the LWM2M server 74 to the remote device 70 and upon receiving the bootstrap request the remote device connects to the bootstrap server 72 (step 100) and receives bootstrap information from the bootstrap server 72 (step 102). Upon receiving the bootstrap information the remote device de-registers with the LWM2M server 74 at step 86 and at step 88 registers with new LWM2M server 76.

Figure 8:
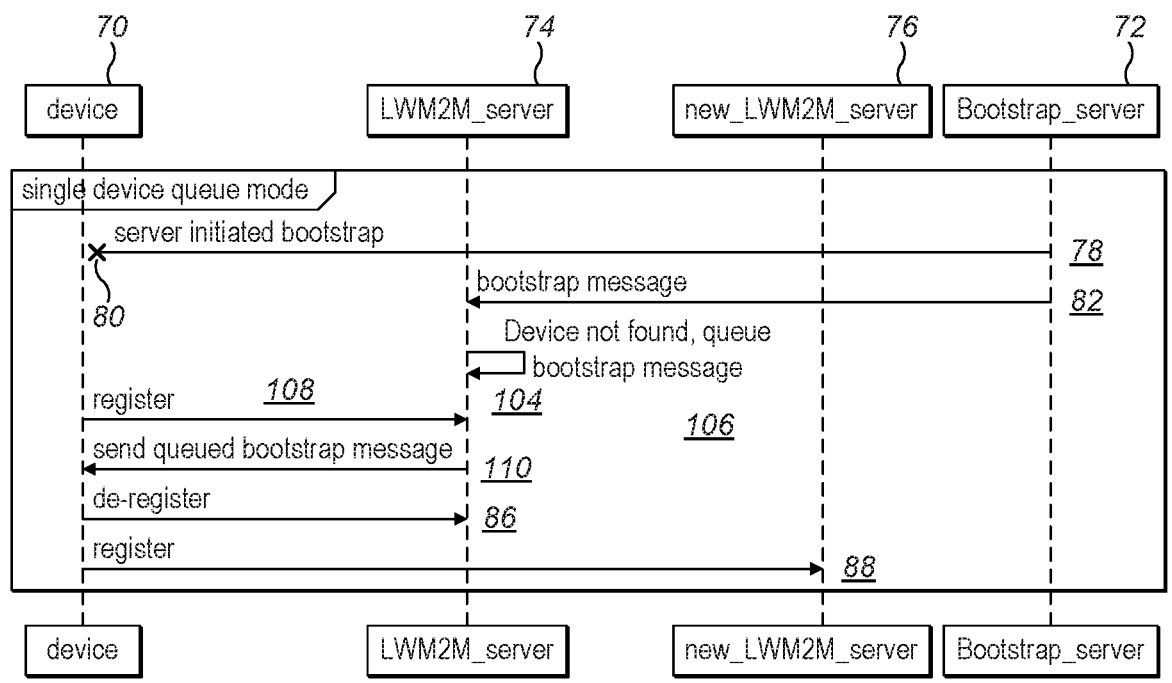
FIG. 8 is a schematic diagram of a bootstrap process to assign a new LWM2M server for a single remote device where the remote device has not yet been registered with its assigned LWM2M server.

FIG. 8 is a schematic diagram of a bootstrap process to assign a new LWM2M server for a single remote device where the remote device has not yet been registered with its assigned LWM2M server 76. The remote device 70 may, for example, have been pre-provisioned to connect to a LWM2M server 76 and may have not yet been switched on or may be in the property of the manufacturer or distributor.

The bootstrap process includes the remote device 70, the bootstrap server 72, the LWM2M server 74 and the new LWM2M server 76. At step 78 a server initiated bootstrap is initiated and the bootstrap server 72 attempts to connect to the remote device 70. The bootstrap server 78 fails at step 80 to connect to the remote device 70. The bootstrap server 78 then attempts to connect with the LWM2M server 74 at step 82 and upon establishing a successful connection delivers the bootstrap information to the LWM2M server 74. However, at step 104 the LWM2M server 74 cannot find the remote device 70 because the remote device 70 has not yet completed its first bootstrapping and provisioning steps to connect to the LWM2M server 74. According the LW2M2M server queues the bootstrap information at step 106.

When the remote device 70 is activated it should follow known bootstrapping and provisioning steps in order to arrive at a step of registration 108 with its assigned L2M2M server 74. Although the registration 108 is successful, the L2M2M server replies with the queued bootstrap information at step 110. Upon receiving the bootstrap information the remote device 70 de-registers with the LWM2M server 74 at step 86 and at step 88 registers with new LWM2M server 76.

Figure 9:
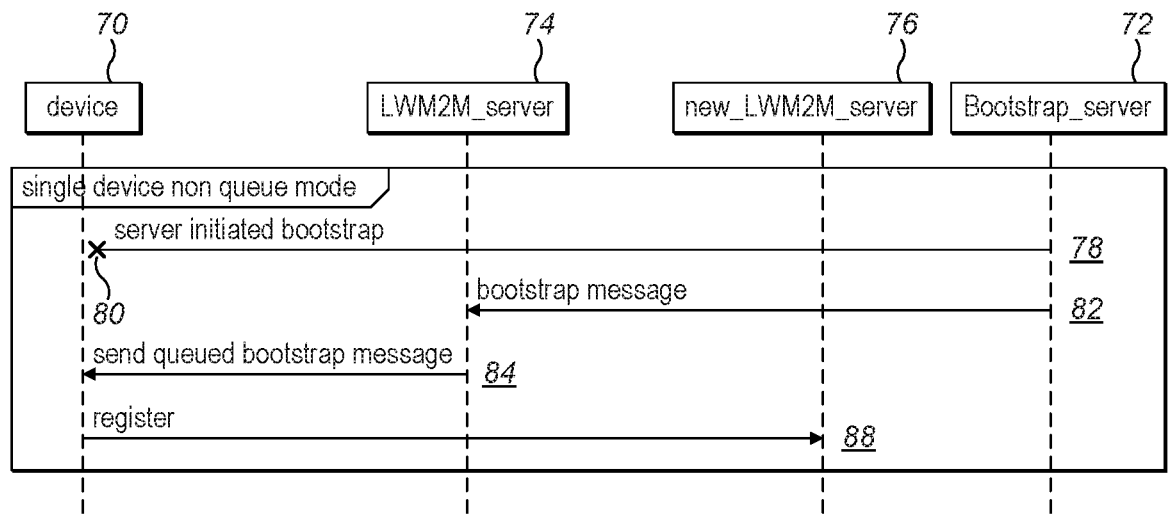
FIGS. 9 and 10 are schematic diagrams of a bootstrap process to assign another LWM2M server for a single remote device.
Figure 10:
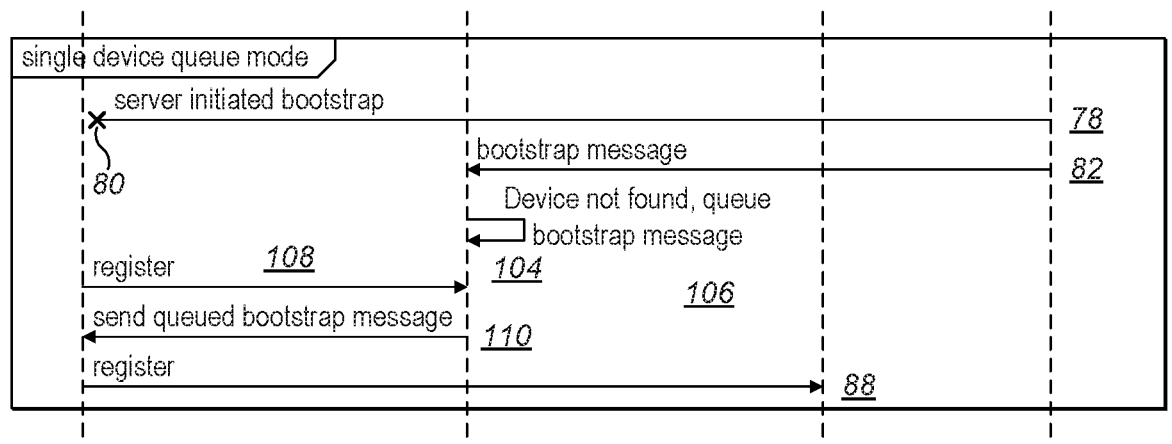

FIGS. 9 to 10 are schematic diagrams of a bootstrap process to assign another LWM2M server for a single remote device. The another LWM2M server may be in addition to the existing assigned LWM2M server or may be in replace of the existing assigned LWM2M server.

Referring to FIG. 9, the bootstrap process includes a remote device 70, a bootstrap server 72, a LWM2M server 74 and a new LWM2M server 76. At step 78 a server initiated bootstrap is initiated and the bootstrap server 72 attempts to connect to the remote device 70. The bootstrap server 78 fails at step 80 to connect to the device 70. The bootstrap server 78 then attempts to connect with the LWM2M server 74 at step 82 and upon establishing a successful connection delivers the bootstrap information to the LWM2M server 74.

The LWM2M server 74 has either previously been provisioned with the remote device 70 and so knows the address of the remote device 70 because it is registered with the remote device 70 or has not yet been provisioned with the remote device 70 but has been provided with a list of device identifications and addresses by a third party (which could be the bootstrap server 72).

In either scenario, the LWM2M server 74 is able to connect to the remote device 70 and deliver the bootstrap information to the remote device 70 at step 84. Upon receiving the bootstrap information the remote device registers with new LWM2M server 76 at step 88. No de-registration step 86 is required because either the remote device 70 has not yet registered with the LWM2M server 74 or is registering the new LWM2M server 76 in addition to the L2M2M server 74.

Referring to FIG. 10, and at step 104, the LWM2M server 74 cannot find the remote device 70 because the remote device 70 has not yet completed its first bootstrapping and provisioning steps to connect to the LWM2M server 74. According the LW2M2M server queues the bootstrap information at step 106.

When the remote device 70 is activated it should follow known bootstrapping and provisioning steps in order to arrive at a step of registration 108 with its assigned L2M2M server 74. If the registration 108 is successful, the L2M2M server replies with the queued bootstrap information at step 110 and at step 88 registers with new LWM2M server 76 in addition to the LWM2M server 74. If the registration is not successful then the L2M2M server may still reply with the queued bootstrap information at step 110 and at step 88 the remote device 70 may register with new LWM2M server 76. No de-registration step 86 is required as described with reference to FIG. 8.

Figure 11:
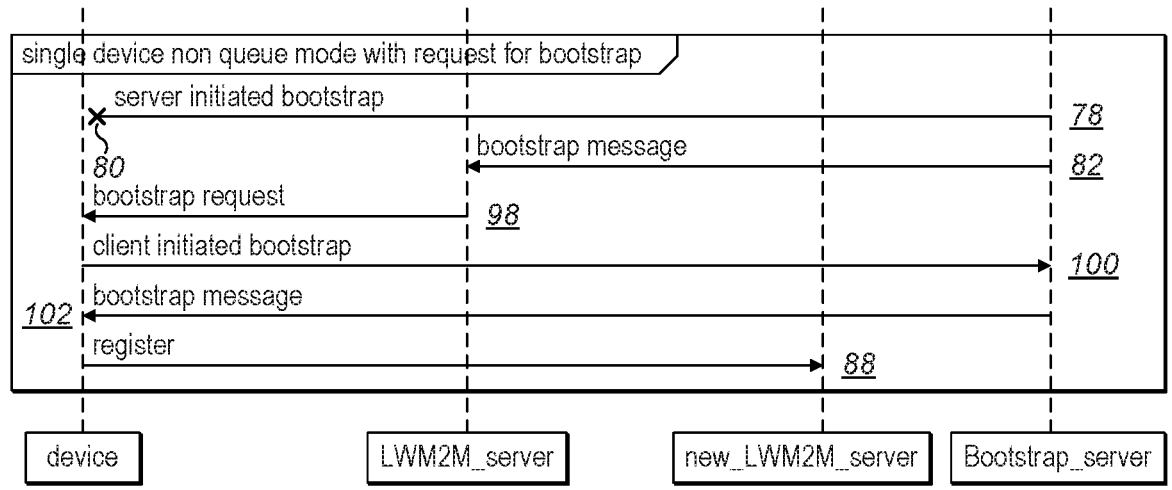
FIG. 11 is a schematic diagram of a bootstrap process when first registration occurs with a newly assigned LWM2M server.

Referring to FIG. 11, the bootstrap server 78 fails at step 80 to connect to the remote device 70. At step 96, a message from the bootstrap server 72 to the LWM2M server 74 is sent, which comprises instructions that the remote device 70 may (in the sense that the remote device should or must) bootstrap with the bootstrap server 72 in the form of a bootstrap request. At step 98, the bootstrap request is sent from the LWM2M server 74 to the remote device 70 and upon receiving the bootstrap request the remote device connects to the bootstrap server 72 (step 100) and receives bootstrap information from the bootstrap server 72 (step 102) causing the remote device 70 to register with the new LWM2M server 76. No step 86 of de-registration is needed as described with reference to FIG. 7, because the remote device has not registered with the L2M2M server 74.

Accordingly, present techniques extend OMA LWM2M specification server initiated bootstrap to go through a LWM2M server. Such an approach allows bootstrapping to occur even when remote devices are located behind a network address translator and/or Firewall which blocks the direct connection from a bootstrap server to the devices. A bootstrap server may also fail to connect to a remote device when the remote device changes its IP address, which may occur in an all peer network such as a mesh network using in 6LoWPAN.

While techniques have been described for a single remote device, it will be appreciated by one skilled in the art that present techniques can be applied to multiple remote devices. In all cases, a bootstrap message or information may be verified and signed by the bootstrap server by way of example using a private key digital certificate. Where bootstrap information is provided, a bootstrap message may contain a multiple parameter in aggregate format like Type, Length and Value (TLV). In other cases, where the message is a request for bootstrap with the bootstrap server then a simple request for bootstrap need only be provided.

While techniques illustrate how bootstrapping may be initiated when the bootstrap server cannot connect to the remote device, it will be appreciated that if the bootstrap server can connect to the remote device, it may choose not to and so may delegate the provisioning of the bootstrap information to the LWM2M server using the techniques described herein.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A machine implemented method of a bootstrap server initiated registration of a remote device with a second device management server when the remote device is provisioned or pre-provisioned for registration with a first device management server, the method comprising:
    signing, with the bootstrap server, a bootstrap message comprising information to allow for registration of the remote device with the second device management server with which the remote device is not provisioned or pre-provisioned for registration, the bootstrap message comprising an instruction to register with the second device management server;
    transmitting the signed bootstrap message from the bootstrap server to the first device management server;
    receiving the signed bootstrap message at the first device management server;
    queuing the signed bootstrap message at the first device management server;
    upon receiving a message from the remote device at the first device management server, sending the signed bootstrap message from the first device management server to the remote device; and
    transmitting, from the remote device, a registration message to the second device management server based on the signed bootstrap message.

2. The method of claim 1, wherein prior to transmitting the bootstrap message from the bootstrap server to the first device management server, the method includes transmitting the bootstrap message from the bootstrap server to the remote device, the bootstrap server and the remote device failing to establish a successful connection.

3. The method of claim 1, wherein the bootstrap server broadcasts its bootstrap message.

4. The method of claim 1, wherein the bootstrap server stores multiple bootstrap messages and transmits the multiple bootstrap messages to the first device management server in one bulk message.

5. The method of claim 1, wherein the bootstrap message comprises instruction for the remote device to bootstrap with the bootstrap server, wherein upon the remote device bootstrapping with the bootstrap server, the bootstrap server returns a bootstrap message to the remote device comprising at least the address of the second device management server.

6. The method of claim 1, wherein prior to registering the remote device at the second device management server, the method includes de-registering the remote device from the first device management server.

7. The method of claim 1, wherein the first device management server receives a plurality of bootstrap messages and queues the plurality of bootstrap messages in a memory store.

8. The method of claim 1, wherein the remote device, the first management server and the second device management server are nodes in a peer network.

9. The method of claim 1, wherein the remote device is an Internet of Things device.

10. A machine implemented method of a bootstrap server initiated registration of a remote device with a second device management server when the remote device is provisioned or pre-provisioned for registration with a first device management server, the method comprising:
    receiving a signed bootstrap message from the bootstrap server at the first device management server, the signed bootstrap message comprising information to allow for registration of the remote device with the second device management server with which the remote device is not provisioned or pre-provisioned for registration;
    queuing the signed bootstrap message at the first device management server; and
    upon receiving a message from the remote device at the first device management server, sending the signed bootstrap message from the first device management server to the remote device, the signed bootstrap message comprising an instruction to the remote device to register with the second device management server.

11. A machine implemented method of a bootstrap server initiated registration of a remote device with a second device management server when the remote device is provisioned or pre-provisioned for registration with a first device management server, the method comprising:
    sending a signed bootstrap message from the bootstrap server to the first device management server for queuing at the first device management server until a message is received from the remote device at the first device management server, the signed bootstrap message comprising information to allow for registration of the remote device with the second device management server with which the remote device is not provisioned or pre-provisioned for registration.

\* \* \* \* \*